United States Patent [19]

Huber et al.

[11] 4,184,880

[45] Jan. 22, 1980

[54] AQUEOUS POLYSILOXANE EMULSIONS WITH MICA TREATED WITH ORGANOSILICON COMPOUND

[75] Inventors: Peter Huber; Jürgen Meusel, both of Burghausen, Fed. Rep. of Germany

[73] Assignee: Wacker-Chemie GmbH, Munich, Fed. Rep. of Germany

[21] Appl. No.: 819,734

[22] Filed: Jul. 28, 1977

[30] Foreign Application Priority Data

Sep. 16, 1976 [DE] Fed. Rep. of Germany ....... 2641699

[51] Int. Cl.$^2$ ............ B28B 7/38; C08K 9/06; C08G 77/18
[52] U.S. Cl. .................. 106/15.05; 106/18; 106/18.29; 106/18.32; 106/18.35; 106/38.22; 106/38.23; 106/38.24; 106/287.11; 106/287.12; 106/287.14; 106/291; 260/23 R; 260/29.6 B; 260/29.2 M; 260/37 SB
[58] Field of Search ............ 106/291, 287.11, 287.12, 106/287.14, 15.05, 18, 18.29, 18.32, 18.35, 38.22, 38.24, 38.23; 260/29.2 M, 23 R, 29.6 B, 37 SB

[56] References Cited

U.S. PATENT DOCUMENTS

| | | | |
|---|---|---|---|
| 2,857,355 | 10/1958 | Iler | 260/29.2 M |
| 2,881,146 | 4/1959 | Remer et al. | 260/29.2 M |
| 3,023,181 | 2/1962 | Te Grotenhuis | 260/29.2 M |
| 3,324,074 | 6/1967 | McManimie | 526/29 |
| 3,713,851 | 1/1973 | Cekada | 106/38.22 |
| 3,817,894 | 6/1974 | Butler et al. | 260/29.2 M |
| 3,872,038 | 3/1975 | Adams et al. | 260/13 |
| 3,877,956 | 4/1975 | Nitzsche et al. | 106/2 |
| 3,905,823 | 9/1975 | Piskoti | 106/38.22 |
| 3,941,864 | 3/1976 | Bosch et al. | 106/38.22 |

*Primary Examiner*—Murray Tillman
*Assistant Examiner*—Arthur H. Koeckert

[57] ABSTRACT

Aqueous diorganopolysiloxane emulsions containing dispersed inorganic silicates which have been treated with an organosilicon compound to impart hydrophobic properties thereto. The resultant dispersions may be employed as release agents especially in molding tires.

4 Claims, No Drawings

AQUEOUS POLYSILOXANE EMULSIONS WITH MICA TREATED WITH ORGANOSILICON COMPOUND

BACKGROUND OF THE INVENTION

Aqueous diorganopolysiloxane emulsions having inorganic silicates dispersed therein and their use as release agents for molding tires has been described in U.S. Pat. No. 3,872,038. In contrast to the aqueous diorganopolysiloxane emulsions having inorganic silicates dispersed therein, the dispersions of this invention have several advantages. For example, the dispersions of this invention have a lower viscosity at the same solids concentration. Moreover, the dispersions of this invention filter much more rapidly than prior dispersions. In addition the dispersions of this invention can be easily sprayed with either the so-called "Airless" equipment or with compressed air equipment. Furthermore, these sprayed dispersions provide a more uniform and finely dispersed coating then the dispersions used heretofore.

Therefore, it is an object of this invention to provide aqueous diorganopolysiloxane emulsions. Another object of this invention is to provide aqueous dispersions containing inorganic silicates and emulsified diorganopolysiloxanes. Still another object of this invention is to provide aqueous dispersions containing inorganic silicates which have been rendered hydrophobic and emulsified diorganopolysiloxanes. A further object of this invention is to provide aqueous dispersions containing inorganic silicates and emulsified diorganopolysiloxanes as release agents. A still further object of this invention is to provide aqueous dispersions which may be applied to a substrate to form a uniform and finely dispersed coating thereon.

SUMMARY OF THE INVENTION

The foregoing objects and others which will become apparent from the following description are accomplished, generally speaking, by preparing aqueous diorganopolysiloxane emulsions containing dispersed inorganic silicates which have been treated with an organosilicon compound to impart hydrophobic properties to the surfaces of the inorganic silicates.

DETAILED DESCRIPTION

The diorganopolysiloxane emulsions employed in this invention are the same diorganopolysiloxanes which have been used or could have been used in the aqueous diorganopolysiloxane emulsions employed heretofore. In addition to the diorganosiloxane units, the diorganopolysiloxanes may also contain other siloxane units, such as triorganosiloxane units which can be located either at the end and/or along a chain consisting of diorganosiloxane units. Other units which may be present are monoorganosiloxane units and/or $SiO_{4/2}$ units. Monoorganosiloxane units and/or $SiO_{4/2}$ units may however be present in addition to the diorganosiloxane units, regardless of whether or not the triorganosiloxane units are present. It is preferred that the emulsified diorganopolysiloxanes contain from 1.75 to 2.25 and more preferably from 1.9 to 2.1 SiC-bonded organic radicals per silicon atom. It is however preferred that at least 90 mol percent of the siloxane units in the emulsified diorganopolysiloxanes be diorganosiloxane units.

It is preferred that the SiC-bonded organic radicals in the emulsified diorganopolysiloxanes be hydrocarbon radicals having from 1 to 18 carbon atoms. Also, these hydrocarbon radicals may be halogenated hydrocarbon radicals. Examples of suitable hydrocarbon radicals having from 1 to 18 carbon atoms are alkyl radicals, such as the methyl radical, ethyl, n-propyl, isopropyl, n-butyl and sec-butyl radical, as well as octyl, dodecyl and octadecyl radicals; cycloalkyl radicals such as the cyclohexyl radical; alkenyl radicals such as vinyl and allyl radicals; aryl radicals such as the phenyl radical; alkaryl radicals such as the tolyl radical; and aralkyl radicals such as the benzyl radical. Examples of halogenated hydrocarbon radicals having from 1 to 18 carbon atoms are the 3,3,3-trifluoropropyl radical and the o-, p- and m-chlorophenyl radicals. Because they are readily available, it is preferred that at least 50 percent of the number of SiC-bonded organic radicals in the emulsified diorganopolysiloxanes be methyl radicals. Also it is preferred that the emulsified diorganopolysiloxanes have a viscosity of at least 1000 cP at 25° C. Their plasticity, as measured with the parallel-plate-plastometer test, in accordance with ASTM-D 926-67, should not exceed 120 mm.

The molecular weight of the emulsified diorganopolysiloxanes can be distributed over a narrow range; in other words they may contain diorganopolysiloxanes all of which have more or less the same viscosity. The molecular weight of the emulsified diorganopolysiloxanes may however also vary over a wide range. Mixtures of emulsified diorganopolysiloxanes having different substituents and different degrees of substitution can be employed.

The emulsified diorganopolysiloxanes may be prepared from polymerized diorganopolysiloxanes having the desired molecular weight in the presence of emulsifying agents such as have been used heretofore in the preparation of diorganopolysiloxane-in-water emulsions in the presence or absence of organic solvents. Also, the emulsified diorganopolysiloxanes can be of the type which are prepared by emulsion polymerization, such as for example in the presence of dodecylsulfonic acid.

Examples of emulsifiers which may be employed in the preparation of diorganopolysiloxane-in-water emulsions are non-ionic polyglycol ethers of alkanols or phenol, or alkylphenols such as polyoxyethylene alkylphenol, nonylphenoxypoly-(ethyleneoxy)-ethanols, polyoxyethylene sorbitol hexastearate, polyoxyethylene dicetylether, polyethylene glycol trimethyl nonyl ether which contains 6 to 14 ethylene oxide units per molecule, polyoxyethylene sorbitol oleate having a saponification number of from 102 to 108 and a hydroxyl number of from 25 to 35, as well as anionic emulsifiers such as sodium alkylarylpolyethylene glycol sulfonate and partial sodium salts of phosphoric acid esters of an adduct of ethylene oxide and nonylphenol which contains from 4 to 10 ethylene oxide units per molecule, with a molecular weight of approximately 1,112 and an acid number of from 7 to 8.

Examples of organic solvents which can be employed in the preparation of the aqueous diorganopolysiloxane emulsions are linear, branched or cyclic aliphatic hydrocarbons, such as hexane, kerosene having a boiling range of from 175° to 290° C., hexadecane, petroleum ether having a boiling range of from 150° to 200° C., cycloaliphatic hydrocarbons such as cyclohexane, chlorinated aliphatic hydrocarbons such as trichloroethylene, trichloroethane, methyltrichloride, carbon tetrachloride and perchloroethylene, as well as aromatic hydrocarbons such as benzene, toluene and xylene.

In the preparation of the aqueous diorganopolysiloxane emulsions of this invention, it is possible to use emulsifiers and solvents in the same proportions as have been used heretofore or which could have been used for the preparation of aqueous diorganopolysiloxane emulsions.

The amount of emulsified diorganopolysiloxanes present in the dispersions of this invention may range from 2 to 25 percent by weight and more preferably from 5 to 18 percent by weight based on the total weight of the dispersions.

The inorganic silicate used in the dispersions of this invention can be the same inorganic silicates which have been used heretofore in aqueous diorganopolysiloxane emulsions which contain inorganic silicates. Suitable examples of inorganic silicates which may be employed are natural or synthetic mica, alkaline earth silicates such as magnesium silicate, aluminum silicate, vermiculite, talc and kaolin. Mica is the preferred inorganic silicate, since it is particularly strong due to its structure and because it acts as a lubricant as well as a release or separation agent. Moreover, it promotes the formation of channels in the coatings through which entrapped air may escape. It is preferred that the inorganic silicate employed in the dispersions of this invention have a particle size of from 0.02 to 0.25 mm. Mixtures consisting of several inorganic silicates may be employed as well.

It is preferred that the inorganic silicates be employed in an amount of from 20 to 60 percent by weight based on the weight of the dispersions.

Any organosilicon compound capable of imparting hydrophobic properties to inorganic substances may be used to treat the inorganic silicates of this invention. Organosilicon compounds which impart hydrophobic properties to inorganic substances are those having the general formula:

$$(R_3Si)_aZ \text{ or } R_{a'}SiZ'_{4-a'}$$

wherein R which may be the same or different represents monovalent hydrocarbon radicals and halogenated hydrocarbon radicals, Z and Z' represent halogen, hydrogen or a radical of the formula —OH, —OR', —NR'X, —ONR', —SR' or —OOCR' and when a is 2, then Z may also represent —O—, —NX— or —S—; R' is a hydrocarbon radical or a substituted hydrocarbon radical, preferably an alkyl radical having from 1 to 4 carbon atoms; X is hydrogen or has the same meaning as R'; a is 1 or 2 and a' is 1, 2 or 3. Other organosilicon compounds which may be employed are octamethylcyclotetrasiloxane and/or dimethylpolysiloxanes having from 2 to 12 siloxane units per molecule in which the dimethylpolysiloxanes have an Si-bonded hydroxyl group in each of their terminal units.

The monovalent and halogenated monovalent hydrocarbon radicals represented by R may be the same as the SiC-bonded organic radicals linked to the diorganopolysiloxanes. Suitable hydrocarbon radicals having from 1 to 18 carbon atoms are alkyl radicals, cycloalkyl radicals, alkenyl radicals, aryl radicals, alkaryl radicals, aralkyl radicals and halogenated derivatives thereof.

Examples of halogen atoms represented by Z and Z' are chlorine, bromine and iodine, with chlorine being the preferred example since it is readily available.

Suitable examples of hydrocarbon radicals represented by R' are the methyl and the ethyl radicals. Additional examples of hydrocarbon radicals represented by R' are described in the following examples of organosilicon compounds which impart hydrophobic properties to inorganic silicates.

Examples of substituted hydrocarbon radicals represented by R' are the methoxyethylene radical and the aminoethyl radical.

Suitable examples of organosilicon compounds which impart hydrophobic properties to inorganic substances are hexamethyldisilazane, trimethylethoxysilane, trimethylsilane, trimethylchlorosilane, dimethyldiethoxysilane, trimethylsilymercaptan, vinyldimethylacetoxysilane, trimethylsilylisopropylamine, trimethylsilylethylamine, phenyldimethylsilypropylamine, vinyldimethylsilylbutylamine, diethylaminoxytrimethylsilane, diethylaminoxyphenyldimethylsilane, hexamethyldisiloxane, 1,3-divinyltetramethyldisiloxane, 1,3-diphenyltetramethyldisilazane, dimethyldichlorosilane, dimethyldimethoxysilane, diphenyldiethoxysilane, vinylmethyldimethoxysilane and methyltriethoxysilane.

It is preferred that organosilanes having the general formula $$R_{a'}{}^1SiOR_{4-a'}{}^2$$

wherein $R^1$ which may be the same or different represents hydrocarbon radicals having from 1 to 18 carbon atoms, $R^2$ which may be the same or different represents alkyl radicals having from 1 to 4 carbon atoms or methoxyethylene radicals and a' is 1, 2 or 3, be reacted with the inorganic silicates because they do not release any by-products which may have a detrimental effect on the dispersions of this invention.

Mixtures of various organosilicon compounds may be employed in the treatment of the inorganic silicates to impart hydrophobic properties thereto.

It is preferred that the amount of organosilicon compound used in the surface treatment of the inorganic silicate be from 0.1 to 10 percent by weight based on the weight of the inorganic silicate.

The inorganic silicate can be reacted with the organosilicon compounds by any conventional technique known in the art for reacting inorganic substances which are solid at room temperature and whose particle diameter is less than 1 mm.

Also, it is possible to react the silicate with hydrophobic imparting organosilicon compounds which evaporate at room temperature at 760 mm Hg (abs.) or at approximately 760 mm Hg (abs.), in a sealed container, such as for example a polyethylene bag, for at least 10 days under ambient conditions. In addition, the silicate can be mixed in a mechanical mixing device with a liquid hydrophobic imparting organosilicon compound. Likewise, the inorganic silicate can be reacted with a hydrophobic-imparting organosilicon compound in a fluidized bed and if desired, in the presence of a stream of inert gas.

The reaction of the inorganic silicate with the organosilicon compound can be accelerated by using catalysts such as ammonia or amines at the rate of from about 0.3 to 3 percent by weight based on the weight of the inorganic silicate.

An inorganic silicate which has been rendered hydrophobic on its surface with an organosilicon compound, can be mixed in water with the diorganopolysiloxane either before, during and/or after the diorganopolysiloxane has been emulsified.

These aqueous diorganopolysiloxane emulsions containing a dispersed inorganic silicate which has been treated with an organosilicon compound to impart hydrophobic properties thereto may be used as a release agent, especially in molding tires.

When the dispersions are used as a release agent in tire molding, sometimes referred to as "lubricants for tire molding" or as "bag lubricants for tire manufacture" or as "rubber lubricants for tire manufacture", they may contain in addition to the emulsified diorganopolysiloxanes, hydrophobic inorganic silicate and additives generally associated with the emulsification of diorganopolysiloxanes in water, other additives which have been used heretofore in the preparation of aqueous diorganopolysiloxane emulsions as release agents. Such additives are dispersing agents other than the dispersing agents which are used in emulsifying the diorganopolysiloxanes, lubricants other than the inorganic silicates and diorganopolysiloxanes, thickening agents and bactericides and/or fungicides, as well as antifoaming agents, rust preventives and dyes.

Examples of dispersing agents which have been used heretofore or which could have been used in emulsifying the diorganopolysiloxanes are lecithin, alkali alkylarylsulfonates, sodium salts of polymerized alkylnaphthalene sulfonic acids and sodium tripolyphosphate as well as the previously mentioned anionic emulsifiers. It is preferred that dispersing agents other than those used in emulsifying the diorganopolysiloxanes or which are additionally used, be present in an amount of from 0.10 to 5.0 percent by weight based on the total weight of the dispersions.

Lubricants other than the inorganic silicates and diorganopolysiloxanes which may be employed are polyethylene glycols, polypropylene glycols and copolymers consisting of ethylene oxide and propylene oxide, in which the polyglycols have an average molecular weight of from 400 to 4,000 and more preferably from 2,000 to 3,000. Examples of other lubricants are castor oil, alkali stearates, copolymers containing dimethylpolysiloxanes and ethylene oxide and/or propylene oxide as well as aminoalkylpolysiloxanes. Although the use of lubricants other than the inorganic silicates and diorganopolysiloxanes is preferred, it is by no means essential that they be employed in the composition of this invention. However, when other lubricants are used they should not be present in an amount greater than 25 percent by weight based on the weight of the dispersions.

Examples of thickening agents which may be employed are magnesium aluminum silicate, carboxyethylcellulose, carboxymethylcellulose, sodium carboxymethylcellulose, sodium carboxymethylhydroxyethylcellulose, hydroxyethylcellulose, methylcellulose, methylhydroxypropylcellulose, ethylhydroxyethylcellulose, methylethylcellulose, methylhydroxyethylcellulose, polyvinyl alcohol and bentonite. It is preferred that the thickening agents be employed in an amount of from 0.01 to 1.5 percent by weight based on the total weight of the dispersions.

Examples of bactericides or fungicides which may be added to these dispersions are sorbic acid, hexamethylenetetramine, 1,3-dichloropropane adducts, formaldehyde and 6-acetoxy-2,4-dimethyl-n-dioxane. When bactericides or fungicides are used, they are preferably employed in an amount of from 0.01 to 1.0 percent by weight based on the total weight of the dispersions.

The amount of water employed is preferably at least 20 percent by weight based on the weight of the dispersions.

The inorganic silicate which has been rendered hydrophobic by reacting its surface with an organosilicon compound can be mixed with water either prior to, during and/or after the diorganopolysiloxane has been emulsified. Also, it is possible to mix the other components of the dispersions of this invention in any desired sequence. Mixing can be carried out by using any of the devices which have been used heretofore or which could have been used in the preparation of the aqueous diorganopolysiloxane emulsions known heretofore which contain dispersed inorganic solids.

The dispersions of this invention may be applied to molding surfaces, for example to the inside of an automobile tire carcass by any technique which is suited for the application of release or separation agents to molding surfaces such as, for example by spraying or spreading.

The dispersions obtained in accordance with this invention can be used not only as tire release or separation agents, but generally as separation agents whenever rubber or plastic objects are molded.

In the following, all parts are by weight unless otherwise specified.

PREPARATION OF AQUEOUS DIORGANOPOLYSILOXANE EMULSIONS

In a planetary-type mixer operating at 64 rpm, are mixed 30 parts of petroleum ether having a boiling range of from 150° to 200° C., 15 parts of dimethylpolysiloxane having terminal Si-bonded hydroxyl groups and which has a plasticity of 100 mm measured in accordance with the parallel-plate-plastometer test (ASTM-D 926-67), and 30 parts of a dimethylpolysiloxane which is end-blocked with trimethylsiloxy groups and which has a viscosity of 60,000 cP at 25° C. until a homogeneous mixture is obtained. About 60 parts of the resultant mixture are added under constant agitation to a mixture containing 2 parts of nonylphenoxypoly-(ethyleneoxy)-ethanol which contains 6 units derived from ethylene oxide (Arkopal N 060, marketed by HOECHST AG, Frankfurt; "Arkopal" is a registered trademark), 5 parts of nonylphenoxypoly-(ethyleneoxy)-ethanol which contains 23 ethylene oxide units (Arkopal N 230), and 4 parts of water until a stable water-in-oil emulsion is obtained. Approximately 56 parts of water are then added to said emulsion with agitation to form an oil-in-water emulsion.

TREATMENT OF MICA

Dimethyldiethoxysilane is added to wet-ground muscovite having a particle size of 325 mesh (0.045 mm) which has been placed in a polyethylene bag at the rate of 5 percent by weight of dimethyldiethoxysilane based on the weight of the mica. The polyethylene bag is sealed and stored for 14 days at room temperature.

EXAMPLE

The following ingredients are placed in a mixing device which operates at 1000 rpm in the sequence indicated.

300.0 parts of water
0.1 part sodium carboxymethylcellulose
8.0 parts lecithin 50.0 parts of a copolymer consisting of ethylene oxide and propylene oxide containing 70 mol percent of ethylene oxide units and 30 mol percent of propylene oxide units and having an average molecular weight of 3,000

100.0 parts of an aqueous diorganopolysiloxane emulsion 4.0 parts of a diorganopolysiloxane-based commercially available anti-foaming agent ("SE47", marketed by Wacker-Chemie GmbH, Munich, West Germany)

350.0 parts of hydrophobic mica treated in accordance with the procedure discribed above.

The mica is added to the mixture comprising the other components over a period of approximately 5 minutes. Mixing at 1000 rpm is then continued for an additional 5 minutes.

COMPARISON EXAMPLE

The procedure described in the above Example is repeated, except that the wet-ground muscovite has not been treated with an organosilane.

The following Table illustrates the properties of the resultant dispersions.

TABLE

| Dispersion prepared as per | Viscosity of dispersion two hours after preparation cP* | Duration of sifting in hours** | Settled after 3 days Weight Percent | Settled after 12 days Weight Percent | Appearance | Characteristics of sprayed coating*** |
|---|---|---|---|---|---|---|
| Example | 5000 | 2 | 4.3 | 5.6 | fine dispersion | Weight of coating: 1.7 gm Uniformly smooth, fine grained |
| Comparison Example | 7000 | 5 | 5.5 | 8.1 | lumpy dispersion | Weight of coating: 1.2 gm Rough, coarse grained |

*Brookfield Viscosimeter RVF, Spindle No. 2 - 2 revolutions per minute
**Through 250 micron sieve, equipped with rotating stripper
***10 seconds with DeVilbiss paint spray gun, 1.0 mm nozzle; compressed air 6 bar, at a distance of 35 cm onto a rotating disk with a diameter of approximately 22 cm.

What is claimed is:

1. An aqueous emulsion containing a diorganopolysiloxane having a viscosity of at least 1000 cP at 25° C. and having mica dispersed therein which has a particle size of from 0.02 to 0.25 mm, said mica having been treated with an organosilicon compound selected from the class consisting of octamethylcyclotetrasiloxane, hydroxyl-terminated dimethylpolysiloxanes having from 2 to 12 siloxane units per molecule and silicon compounds having the formula $(R_3Si)_aZ$ and $R_{a'}SiZ'_{4-a'}$ 

in which R is selected from the class consisting of monovalent hydrocarbon radicals having from 1 to 18 carbon atoms and halogenated hydrocarbon radicals, Z and Z' are radicals selected from the class consisting of halogen, hydrogen, —OH, —OR', —NR'X, —ONR', —SR', —OOCR' and when a is 2, then Z is also selected from the class consisting of —O—, =NX and —S—, R' is selected from the class consisting of a hydrocarbon radical and a substituted hydrocarbon radical, X is selected from the class consisting of hydrogen and R', a is 1 or 2 and a' is 1, 2 or 3.

2. The aqueous diorganopolysiloxane emulsion of claim 1, wherein the mica has been treated with an organosilane having the general formula:

$R_{a'}^1 SiOR_{4-a'}^2$ 

in which $R^1$ is a hydrocarbon radical having from 1 to 18 carbon atoms, $R^2$ is selected from the class consisting of alkyl radicals having from 1 to 4 carbon atoms and methoxyethylene radicals and a' is 1, 2 or 3.

3. The aqueous diorganopolysiloxane emulsion of claim 1, wherein the mica has been treated with an organosilicon compound at the rate of 0.1 to 10 percent by weight, based on the weight of the mica.

4. An aqueous dispersion containing:
   2 to 25 percent by weight of a diorganopolysiloxane having a viscosity of at least 1000 cP at 25° C.
   20 to 60 percent by weight of mica having a particle size of from 0.02 to 0.25 mm which has been treated with an organosilicon compound selected from the class consisting of octamethylcyclotetrasiloxane, hydroxyl-terminated dimethylpolysiloxanes having from 2 to 12 siloxane units per molecule and silicon compounds having the formula $(R_3Si)_aZ$ and $R_{a'}, SiZ'_{4-a'}$ 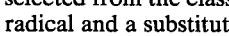

in which R is selected from the class consisting of monovalent hydrocarbon radicals having from 1 to 18 carbon atoms and halogenated hydrocarbon radicals, Z and Z' are radicals selected from the class consisting of halogen, hydrogen, —OH, —OR', —NR'X, —ONR', —SR', —OOCR' and when a is 2, then Z is also selected from the class consisting of —O—, =NX and and —S—, R' is selected from the class consisting of a hydrocarbon radical and a substituted hydrocarbon radical, X is selected from the class consisting of hydrogen and R', a is 1 or 2 and a' is 1, 2 or 3,
   0.10 to 5.0 percent by weight of a dispersing agent
   0 to 25 percent by weight of lubricants other than the mica and diorganopolysiloxane
   0.01 to 1.5 percent by weight of a thickening agent
   0.01 to 1.0 percent by weight of a bactericide and at least
   20 percent by weight of water,
   in which the percent by weight is based on the total weight of the dispersion.

* * * * *